United States Patent

[11] 3,599,853

[72] Inventors: Walter Munch, Berliner-Strasse; Wilhelm Bachmann, Friedhofsstrasse, both of, Germany
[21] Appl. No.: 839,976
[22] Filed: July 8, 1969
[45] Patented: Aug. 17, 1971
[73] Assignee: Schilds Aktiengesellschaft Bad Hersfeld, Germany
[32] Priority: July 17, 1968
[33] Germany
[31] P 17 60 902.8

[54] DEVICE FOR CONTINUOUSLY LOADING STRIP-FORM MATERIAL ONTO A CONVEYOR BELT OF A DRYER OR THE LIKE
8 Claims, 2 Drawing Figs.

[52] U.S. Cl. .................................................. 226/171
[51] Int. Cl. ...................................................... B65h 29/16
[50] Field of Search .......................................... 226/118, 119, 171

[56] References Cited
FOREIGN PATENTS
567,151    5/1958   Belgium ..................... 226/118
1,237,591  6/1960   France ....................... 226/118
1,008,331  10/1965  Great Britain ............. 226/118

Primary Examiner—Allen N. Knowles
Attorney—Hill, Sherman, Meroni, Gross & Simpson ABSTRACT: A device for continuously loading strip-form material onto a substantially horizontally disposed conveying surface of a dryer or the like comprises an upstanding chute having strip-form material deposited thereinto in overlapping longitudinally pleated layers, means forming an arcuately extending shaft receiving layers from the chute with opposite edges of the layers abutting radially spaced, arcuately shaped inner and outer wall portions defining the shaft, and transfer means directing layers of the strip-form material to a substantially horizontally disposed conveying surface. A drum or wheel member having a cylindrical peripheral surface forms the shaft inner wall and is rotated to impart a desired circumferential velocity thereto, and an arcuately extending run or path of a continuous conveyor belt forms the radially spaced outer wall and is driven in a manner to impart a circumferential velocity thereto in excess of that of the inner wall, thereby turning or flipping the overlapped layers of the strip-form material so that leading layers overlap or overlie adjacent trailing layers as the material is transferred onto the conveying surface.

PATENTED AUG 17 1971 3,599,853

INVENTORS
WALTER MÜNCH
WILHELM BACHMANN

BY *Kill, Sherman, Meroni, Gross & Simpson* ATTORNEYS

DEVICE FOR CONTINUOUSLY LOADING STRIP-FORM MATERIAL ONTO A CONVEYOR BELT OF A DRYER OR THE LIKE

BACKGROUND OF THE INVENTION

1. Field of the Invention

The present invention generally relates to feeding devices for conveying systems, and more particularly refers to devices for feeding strip-form material onto substantially horizontally disposed conveying surfaces of dryers or the like.

2. Description of the Prior Art

Natural or synthetic fiber cables or strip-form material is generally processed through drying equipment including a substantially horizontally disposed conveying surface extending through the apparatus for conveying the material past means forcing air thereonto.

Heretofore, it has been common practice to deposit the strip-form material in a flat orientation longitudinally onto the conveying surface. In an attempt to improve utilization of the entire conveying surface, it has been suggested to deposit the strip of material onto the conveying surface in a series of overlapped layers extending transversely of the conveying surface.

With prior art devices for continuously loading the conveying surface with overlapping, transversely extending layers, removal of the layers from the conveying surface has proved difficult and oftentimes results in the strip material becoming tangled.

SUMMARY OF THE INVENTION

We have found that depositing layers of strip material on a horizontal conveying surface so that leading layers overlie or overlap adjacent trailing layers significantly facilitates effortless and tangle-free removal of the strip from the conveyor.

In accordance with the principles of the present invention, a device for loading strip-form material onto a horizontal conveying surface generally comprises means forming a substantially upstanding chute having a rectangular configuration in transverse cross section, material-feeding means depositing strip-form material into the cute in a longitudinally pleated manner providing a stack of overlapped layers within the chute, means forming an arcuately extending shaft receiving layers of the strip material from the chute and having arcuate, radially spaced inner and outer wall portions, and transfer means conveying layers of the material onto the horizontal conveying surface.

One substantially upstanding wall of the chute, the outer wall portion of the arcuately extending shaft and the transfer means are defined by a path of travel of a continuous conveyor belt comprising a series of articulately joined, foraminous plate members trained around idlers defining the belt path of travel. In particular, a vertical run of the conveyor cooperates with an adjustably mounted, vertically disposed plate to form the upstanding chute, and an arcuate run or path of the conveyor extending through an angle between 90° and 180° defines the outer, arcuate wall portion of the arcuately extending shaft. A drum or wheel member having a cylindrical peripheral surface radially inwardly spaced of the arcuate conveyor belt run a distance substantially equal to a transverse width of the layers defines the inner wall of the arcuately extending shaft. The transfer means includes a rising run of the conveyor belt extending tangentially from the arcuate run and rising to the horizontal conveying surface disposed at a level approximately coplanar with a longitudinal axis of the drum.

Suitable drive means rotate the drum in a manner to impart a desired circumferential velocity to the outer cylindrical surface thereof, whereas the continuous conveyor belt is propelled around its path in an opposite angular direction and in a manner to propel the continuous belt through the arcuate run at a circumferential velocity in excess of that of the drum surface. Preferably, the inner and outer shaft wall portions are moved at equal angular velocities, and due to the radial spacing therebetween, the outer wall moves at a circumferential velocity slightly exceeding that of the inner wall.

As the overlapped layers extending transversely of the conveyor belt are advanced through the arcuately extending shaft, leading ones of the layers are turned in a manner so that they overlap or overlie adjacent trailing layers as the strip is deposited on the horizontally extending conveying surface. In that manner, each transversely extending layer deposited on the horizontal conveying surface overlies adjacent trailing layers, thereby permitting an initial layer and subsequent layers to be lifted upwardly from the conveying surface without disturbing or interfering with adjacent trailing layers. Thus, tangle-free removal of the strip material from the conveying surface is provided by the apparatus and method of the present invention.

BRIEF DESCRIPTION OF THE DRAWINGS

Other objects, features and advantages of the present invention will be readily apparent from the following description of a preferred embodiment thereof, taken in conjunction with the accompanying drawing, although variations and modifications may be effected without departing from the spirit and scope of the novel concepts of the disclosure or our contribution to the art, and in which.

DETAILED DESCRIPTION OF THE PREFERRED EMBODIMENT

Figure 1:
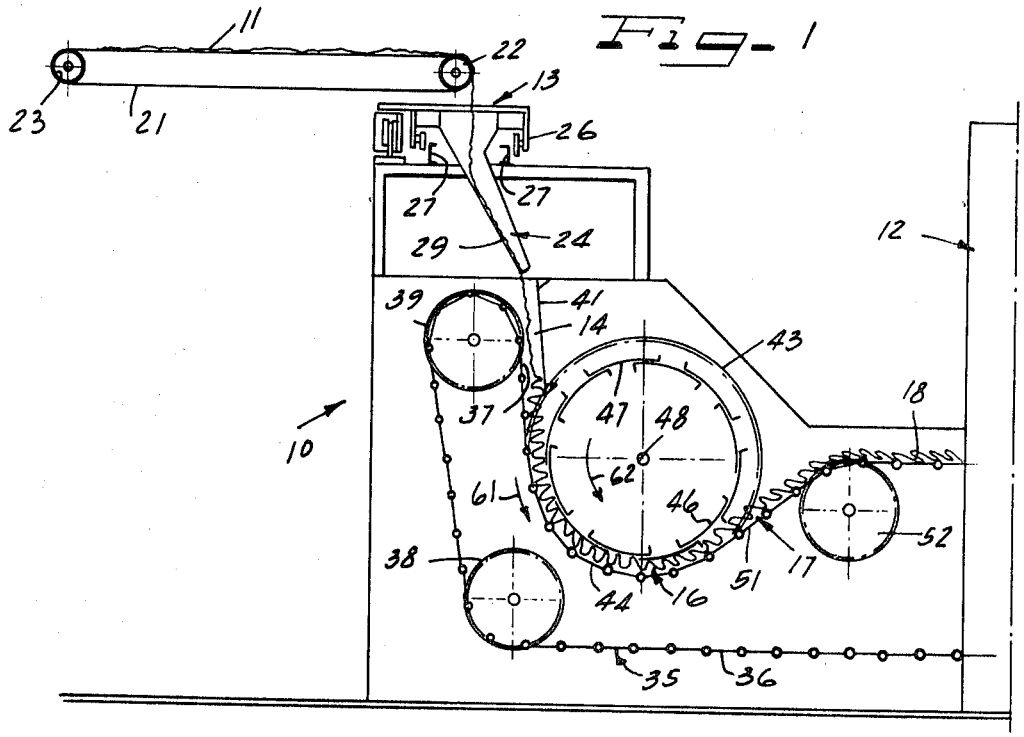
FIG. 1 is a somewhat schematic, side elevational view of a conveyor-loading device embodying features and principles of the present invention.
Figure 2:
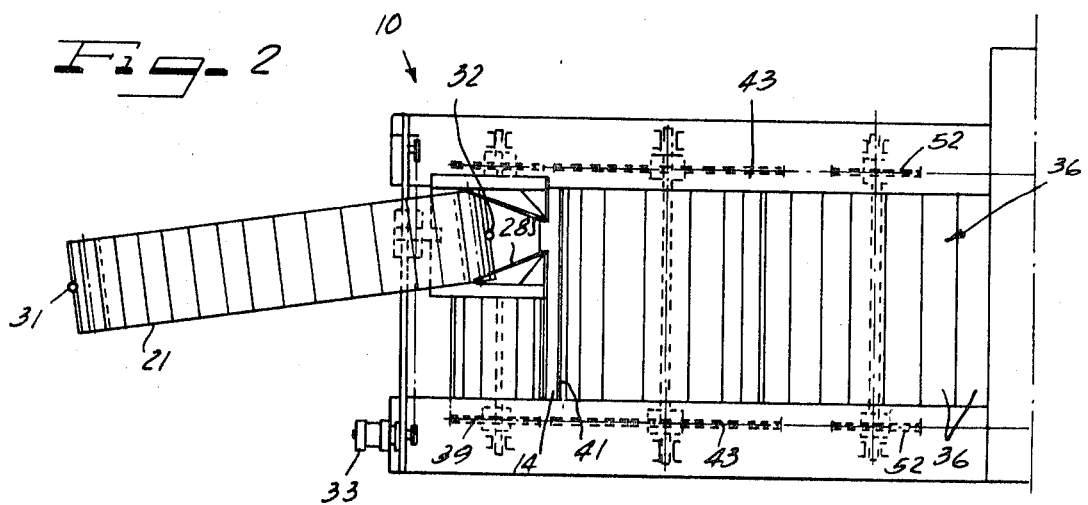
FIG. 2 is a top plan view of the device illustrated in FIG. 1.

Referring to the drawing, an apparatus 10 for continuously loading strip-form material 11 onto a horizontally disposed conveying surface passing through a dryer 12, or the like, comprises material feeding means generally indicated at 13, a storage chute 12 receiving strip-form material from the feeding means, an arcuately extending shaft 16 and transfer means 17 directing the strip-form material from the arcuate shaft to a horizontal conveying surface 18 entering the dryer 12.

The feed means 13 is characterized as comprising a substantially horizontally disposed belt conveyor 21 trained around a head pulley 22 and a return idler 23, a guide trough 24 and a wheeled carriage 26, supported on spaced rails 27, 27 and supporting a head end of the conveyor 21 and the guide trough 24. The strip-form material 11 is flatly deposited on an upper run of the belt conveyor 21 and fed longitudinally therealong to the guide trough 24 having converging sidewalls 28, 28 and a downwardly elongated backwall 29 directing the strip-form material 11 into the storage chute 14.

In accordance with the principles of the present invention, the belt conveyor 21 including the pulley 22 and the idler 23 has a return end thereof mounted for pivotal movement about a vertical axis as at 31 and a head end thereof supported by the carriage 26 for pivotal movement about a vertical axis as at 32 and lateral movement with the carriage in a horizontal plane. Also, drive means including a suitable motor 33 oscillates the carriage 26 transversely of the storage chute 14, thereby depositing the strip-form material 11 in the storage cute in a series or stack of overlapping, longitudinally folded layers or pleats with each layer extending transversely of the storage chute 14. Each layer may also have longitudinally extending pleats formed therealong.

It is contemplated by the present invention that one wall of the chute 14, one wall of the arcuately extending shaft 16, the transfer means 17 and the horizontally disposed conveying surface 18 be defined by a path of travel of a continuous conveyor belt 35 characterized as comprising a multiplicity of articulately joined, porous or perforate plate members as at 36. The continuous belt 35 is trained around a driven head pulley (not shown) disposed at a discharge end of the dryer 12 and driven by suitable motor means.

In order to form a moving wall portion as at 37 for the chute 14, the continuous belt 35 is trained around a lower pair of return idlers as at 38 and an upper pair of return idlers as at 39, thereby defining a descending, vertically disposed run of the belt 35 forming the chute wall 37. A vertically disposed plate 41 is adjustably supported in spaced relationship to the conveyor run 37 to form a wall of the chute 14 confronting the conveyor run 37. Desirably, the plate 41 is adjusted toward and away from the conveyor run 37 to form the chute 14 with a width substantially equal to a width of the strip 11, thereby to confine he pleats or overlapping layers of the strip-form material into a vertically extending stack.

Furthermore, in accordance with the principles of the present invention, a pair of axis-parallel, horizontally spaced idler pulleys or gears 43, 43 train the continuous belt 35 into a concave arcuate run as at 44 extending in the direction of belt travel from the vertical descending run 37. Each idler gear or pulley 43 is characterized as comprising a plurality of radially extending spokes mounting an inner series of circumferentially spaced, arcuately shaped plates 46 disposed at a common radial distance from an axis 48 of the gears 43 and an outer series of arcuately extending, circumferentially spaced plates 47 disposed at common radial distances from the axis 48 slightly exceeding that of the plates 46 and having circumferentially opposite end portions overlapping portions of the inner series of plates. The arcuately shaped plates 46 and 47 extend between the axially spaced pair of gears 43, 43 and cooperate to form a drumlike member having a substantially cylindrical peripheral surface radially spaced inwardly of the arcuate conveyor run 44, thereby forming the arcuately extending shaft 16 having an outer wall defined by the arcuate conveyor run 44 and an inner wall radially inwardly spaced from the outer wall and defined by the cylindrical drum surface.

If desired, the arcuately shaped plates 46 and 47 may be mounted on the gear spokes in a manner to be radially adjustably therealong for permitting adjustment of the radial spacing between outer and inner wall of the arcuately extending shaft 16. In that manner, the device 10 may be adapted for accepting strip-form material having different transverse widths. Furthermore, the adjustable plate 41 forming one wall of the chute 14 is desirably adjusted to lie along a plane tangent to the cylindrical surface defined by the arcuately shaped plates 46 and 47.

The transfer means 17 is particularly characterized as comprising a rising run as at 51 of the articulately jointed conveyor belt 35 extending tangentially of the arcuate run 44 to a horizontal plane level with the axis 48 of the idler gears 43. The rising run or path 51 of the conveyor belt 35 is defined by a pair of axis-parallel, laterally spaced idler pulleys or gears 52, 52 having the conveyor belt trained thereover and disposed to direct the conveyor belt along a substantially horizontal plane level with the axis 48, thereby forming the horizontally disposed conveying surface 18 entering the dryer 12.

In operation, the articulately jointed conveyor belt 35 is driven at a much slower speed than that of the feed conveyor 21, for example at one-tenth the speed of the conveyor belt 21, and thus, the strip of material is removed from the vertically extending storage chute 14 at a slower rate than the same is delivered thereto. Also, the oscillating motion of the guide trough 24 transversely of the conveyor 35, and thus transversely of the chute 14 deposits the strip material 11 in the storage chute in overlapping layers extending transversely of the chute with each layer being somewhat longitudinally pleated. The belt conveyor 35 is driven in a clockwise direction around its path of travel so that an upper path thereof moves to the right as indicated by arrow 61, and the drum formed by plates 46 and 47 rotates in a counterclockwise direction as indicated by arrow 62.

Furthermore, since the belt 35 directly drives the gears 43 mounting the plates 46 and 47, the radially spaced inner and outer wall portions defining the arcuately extending shaft 16 move at equal angular velocities and due to radial spacing therebetween, the outer wall moves at a greater circumferential velocity than that of the inner wall. If desired, the drum formed by the arcuately shaped plates 46 and 47 may be separately driven, but it is contemplated by the present invention that the outer wall of the arcuately extending shaft 16 travel at a greater circumferential velocity than that of the inner wall. The differences in circumferential velocity between the outer and inner walls of the arcuately extending shaft 16 causes overlapping layers of the strip material 11 to turn as the same pass through the shaft 16 from the chute 14 to the rising transfer run 51. Thus, leading ones of the layers of strip material 11, which are overlapped by adjacent trailing edges in the chute 14, are turned relative to the adjacent trailing layers so that leading layers overlie or overlap trailing layers as the strip material discharges from the arcuately extending shaft onto the rising transfer run 51.

The layers are further laid back or spread apart as they travel up the rising transfer run 51, over a blunt bend defined by the idler pulleys or gears 52 and onto the horizontal conveying surface 18. In order to properly turn the overlapped layers in a manner contemplated by the present invention, and included angle between the descending conveyor run 37 and the rising transfer run 51, and thus an angular extent of the shaft 16, should be greater than 90° but not exceed 180°.

If desired, the feeding means 13 may include a pair of guide troughs separately receiving strips of material and arranged to interpleat or interleave two strips of material in transversely extending layers within the chute 14.

Although various minor modifications might be suggested by those versed in the art, it should be understood that we wish to embody within the scope of the patent warranted hereon all such modifications as reasonably and properly come within the scope of our contribution to the art.

We claim as our invention:

1. A device for continuously loading strip-form material onto a horizontally disposed conveying surface, comprising:
    means forming a main continuous conveyor belt having a concave, arcuate run;
    means forming a rotatably disposed member overlying said arcuate conveyor run and having a substantially cylindrical peripheral surface confronting, and radially inwardly spaced from, said arcuate run to define an arcuately extending shaft having radially spaced inner and outer wall portions respectively defined by said outer cylindrical surface and a confronting surface of said conveyor passing through said arcuate run;
    means for feeding and guiding at least one continuous strip of material into an inlet end of said arcuate shaft in overlapping layers extending transversely of said conveyor belt;
    drive means rotating said cylindrical surface in one angular direction and propelling said continuous conveyor belt in an opposite angular direction and at a velocity so that said conveyor moves through said arcuate run at a circumferential velocity exceeding a circumferential velocity of said cylindrical surface for advancing overlapped layers of the strip of material through the arcuately extending shaft;
    transfer means receiving layers of the strip material from said arcuate shaft and delivering the same to a substantially horizontally disposed conveying surface, whereby the material will be deposited onto the horizontal conveying surface with leading ones of the layers overlapping adjacent trailing layers, thereby enabling tangle-free removal of the strip material from the horizontal conveying surface.

2. A device as claimed in claim 1, and further characterized by said drive means rotating said cylindrical surface at one angular velocity and propelling said conveyor so that said conveyor moves through said arcuate run at an angular velocity equal to that of said rotating, cylindrical surface.

3. A device as defined in claim 1, and further characterized by said feeding and guiding means comprising:
    a substantially horizontally disposed continuous belt conveyor having an inlet end and a discharge end for feeding strip-form material in a flat disposition longitudinally therealong from the inlet end to the discharge end;

means mounting the inlet end of said conveyor for pivotal movement about a vertically disposed axis;

means forming a guide trough receiving strip material from said feeding conveyor and directing the material downwardly toward said arcuately extending shaft;

means forming a carriage disposed for oscillatory movement transversely of said main continuous conveyor belt and supporting said guide trough and the discharge end of said conveyor for movement therewith;

means forming an upstanding chute receiving strip material from said guide trough and directing the same to said arcuately extending shaft; and drive means oscillating said carriage transversely of said main conveyor belt to deposit the strip material in said chute in overlapping layers extending transversely of said main conveyor belt.

4. A device as defined in claim 3, and further characterized by said upstanding chute comprising:
a substantially vertical, descending run of said main conveyor belt extending from said guide trough to said arcuately extending run; and
a substantially vertically disposed plate member spaced from said vertical run and disposed substantially tangentially of said rotating cylindrical surface.

5. A device as defined in claim 1, and further characterized by said transfer means including a rising run of the main conveyor belt extending tangentially from said arcuately extending run and terminating at a point substantially level with a longitudinal axis of said cylindrical surface.

6. A device as defined in claim 1, and further characterized by said arcuately extending run of said main conveyor having an angular extent greater than 90° but not exceeding 180°.

7. A device as defined in claim 1 and further characterized by said rotatably disposed member comprising:
a pair of axis-parallel, laterally spaced idlers engaging said main conveyor belt in a manner to define said arcuately extending run;
an inner series of arcuately shaped sections extending between and mounted on, said pair of idlers and circumferentially spaced therearound at common radial distances from an axis thereof; and
an outer series of arcuately shaped sections extending between, and mounted on, said pair of idlers and circumferentially spaced therearound at slightly greater common radial distances than said inner series and having circumferentially opposite end portions overlapping end portions of adjacent ones of said inner series of arcuately shaped sections.

8. A device as defined in claim 7 and further characterized by means for adjustably moving said inner series and said outer series of arcuately shaped sections radially of said idlers to vary a radial width of said arcuately extending shaft.